UNITED STATES PATENT OFFICE.

FREDERICK EVANS, OF NEW YORK, N. Y.

IMPROVEMENT IN TREATING DAMAGED COFFEE.

Specification forming part of Letters Patent No. 134,791, dated January 14, 1873.

*To all whom it may concern:*

Be it known that I, FREDERICK EVANS, of the city, county, and State of New York, have invented a new and Improved Process for Roasting Damaged Coffee; and that the following is a full, clear, and exact description of the same.

This invention is in the nature of a process for making marketable black and discolored coffee-beans known to the trade as "skimmings;" and it consists simply, after subjecting the blackened and inferior beans to the renovating process before described by me in an application for Letters Patent bearing even date with this present application, in placing the beans in an ordinary coffee-roaster, and adding to the coffee Venetian red, in the proportion of two ounces of the pigment to one hundred pounds of the coffee. The addition of this pigment gives to the roasted coffee a rich brown color which it would not otherwise have, and has no deleterious effect, making coffee which would otherwise be of but little value find ready sale, thereby saving the importers and traders from a large percentage of loss which they would otherwise be subjected to.

Having thus described my invention, what I claim as new, and desire to secure by Letters Patent, is—

The process of roasting coffee, hereinbefore described.

FREDERICK EVANS.

Witnesses:
    H. L. WATTENBERG,
    G. M. PLYMPTON.